(12) United States Patent
Boatman et al.

(10) Patent No.: US 9,341,501 B1
(45) Date of Patent: May 17, 2016

(54) ANALOG GAUGE DRIVER (71) Applicant: Brunswick Corporation, Lake Forest, IL (US)

(72) Inventors: John R. Boatman, Fond du Lac, WI (US); Jacob A. Yadon, Fond du Lac, WI (US); Michael P. Dengel, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 421 days.

(21) Appl. No.: 14/017,773

(22) Filed: Sep. 4, 2013

Related U.S. Application Data (60) Provisional application No. 61/787,159, filed on Mar. 15, 2013.

(51) Int. Cl.
*G01D 7/00* (2006.01)
*G01D 3/02* (2006.01)
*G01K 13/02* (2006.01)

(52) U.S. Cl.
CPC ............. *G01D 7/00* (2013.01); *G01D 3/022* (2013.01); *G01K 13/02* (2013.01)

(58) Field of Classification Search
CPC ............ G01D 1/00; G01D 3/00; G01D 3/02; G01D 3/021; G01D 3/022; G01D 3/024; G01D 3/028; G01D 3/032; G01D 3/036; G01D 3/0365; G01D 7/00; G01K 13/02
USPC ............ 340/691.6, 693.1, 693.2, 693.4, 7.55; 361/157, 158, 152; 374/141, 144, 145; 702/64, 74, 98, 99, 100, 104, 113, 118
See application file for complete search history.

(56) References Cited

U.S. PATENT DOCUMENTS 4,292,658 A * 9/1981 Locher ................... F02D 41/22
                                                                    361/187
4,768,471 A   9/1988 Draxler et al.
(Continued)

FOREIGN PATENT DOCUMENTS

JP              60168014 A  *  8/1985  ............... G01D 3/06

OTHER PUBLICATIONS

2012 Quicksilver Precision Parts & Accessories Guide, Instruments, pp. 409-441.

(Continued)

*Primary Examiner* — R. A. Smith
(74) *Attorney, Agent, or Firm* — Andrus Intellectual Property Law, LLP (57) ABSTRACT

A system for driving an analog gauge that displays an indication of a condition of a vehicle has a microcontroller that receives signals representing a voltage at a sender terminal of the analog gauge and the condition of the vehicle. The microcontroller determines a desired resistance based on the condition of the vehicle and a current command signal based on the desired resistance and the voltage at the sender terminal. The microcontroller sends the current command signal to a current driver circuit to command a flow of current. The current driver circuit is coupled to the sender terminal and has a virtual resistance simulated by the flow of current through the current driver circuit and the voltage at the sender terminal. The analog gauge is driven according to the virtual resistance of the current driver circuit and displays the indication of the condition of the vehicle.

20 Claims, 3 Drawing Sheets

(56) References Cited

U.S. PATENT DOCUMENTS

| | | | |
|---|---|---|---|
| 4,939,675 A | | 7/1990 | Luitje |
| 5,469,137 A | * | 11/1995 | Muto ................ G01D 7/002 |
| | | | 340/441 |
| 5,519,397 A | | 5/1996 | Chapotot et al. |
| 5,918,193 A | * | 6/1999 | Jamieson ............ G01D 3/022 |
| | | | 702/100 |
| 6,249,418 B1 | * | 6/2001 | Bergstrom ............ F01L 9/04 |
| | | | 361/152 |
| 6,996,488 B2 | * | 2/2006 | Chu ................. G01D 18/008 |
| | | | 341/120 |
| 7,180,798 B2 | * | 2/2007 | Nishikawa .......... G01D 3/022 |
| | | | 327/356 |
| 7,398,173 B2 | * | 7/2008 | Laraia ............... G01D 18/008 |
| | | | 702/99 |
| 8,360,637 B2 | * | 1/2013 | Kato ................ B41J 2/04541 |
| | | | 374/141 |
| 8,644,038 B2 | * | 2/2014 | Sasaki ............ G01R 19/0092 |
| | | | 361/93.2 |
| 8,849,520 B2 | * | 9/2014 | Hammerschmidt  B60W 50/0205 |
| | | | 701/29.8 |
| 2013/0043908 A1 | * | 2/2013 | Hammerschmidt ..... H03K 5/22 |
| | | | 327/87 |
| 2014/0055146 A1 | * | 2/2014 | Herzer ............... G01R 35/005 |
| | | | 324/601 |

OTHER PUBLICATIONS

Gauges: SmartCraft, by Livorsi Marine Inc., http://www.livorsi.com/catalog/smartcraft.htm, web site visited on Aug. 22, 2013.

Programmable current driver with transistor output current booster, by Prof. T. C. O'Haver, Department of Chemistry and Biochemistry, The University of Maryland at College Park, http://terpconnect.umd.edu/~toh/ElectroSim/CurrentSource.html, web site visited on Aug. 21, 2013.

SmartCraft Gauge Rims, by Livorsi Marine Inc., http://www.livorsi.com/catalog/smartcraft_access.htm, web site visited on Aug. 22, 2013.

\* cited by examiner

ANALOG GAUGE DRIVER

CROSS REFERENCE TO RELATED APPLICATION

This application claims the benefit of and priority to U.S. Provisional Application No. 61/787,159, filed Mar. 15, 2013, the disclosure of which is hereby incorporated by reference in its entirety.

BACKGROUND AND FIELD

The present disclosure relates to systems and methods for driving an analog gauge. The analog gauge displays an indication of a condition of a vehicle, such as a sensed condition of the vehicle.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

The present disclosure is directed to a system for driving an analog gauge that displays an indication of a condition of a vehicle. The system comprises a microcontroller that receives a signal representing a voltage at a sender terminal of the analog gauge and a signal representing the condition of the vehicle. A current driver circuit is in signal communication with the microcontroller. The microcontroller determines a desired resistance based on the condition of the vehicle, and determines a current command signal based on the desired resistance and the voltage at the sender terminal of the analog gauge. The microcontroller sends the current command signal to the current driver circuit to command a flow of current through the current driver circuit. The current driver circuit is coupled to the sender terminal of the analog gauge and has a virtual resistance simulated by the flow of current through the current driver circuit and the voltage at the sender terminal of the analog gauge. The analog gauge is driven according to the virtual resistance of the current driver circuit so as to display the indication of the condition of the vehicle.

The present disclosure is also directed to a method for displaying an indication of a sensed condition of a vehicle with an analog gauge. The method comprises receiving a signal representing the sensed condition of the vehicle, determining a value of the sensed condition of the vehicle, and determining a desired resistance that corresponds to the value of the sensed condition of the vehicle. The method further comprises determining a voltage at a sender terminal of the analog gauge and determining a current command signal based on the desired resistance and the voltage at the sender terminal of the analog gauge. The method further comprises sending the current command signal to a current driver circuit coupled to the sender terminal of the analog gauge to command a flow of current through the current driver circuit, and driving the analog gauge according to a virtual resistance of the current driver circuit so as to display the indication of the sensed condition of the vehicle. The virtual resistance of the current driver circuit is simulated by the flow of current through the current driver circuit and the voltage at the sender terminal of the analog gauge.

BRIEF DESCRIPTION OF DRAWINGS

The present disclosure is described with reference to the following Figures. The same numbers are used throughout the Figures to reference like features and like components.

DETAILED DESCRIPTION

In the present description, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible within the scope of the appended claims. Each limitation in the appended claims is intended to invoke interpretation under 35 USC §112(f) only if the terms "means for" or "step for" are explicitly recited in the respective limitation.

Figure 1:
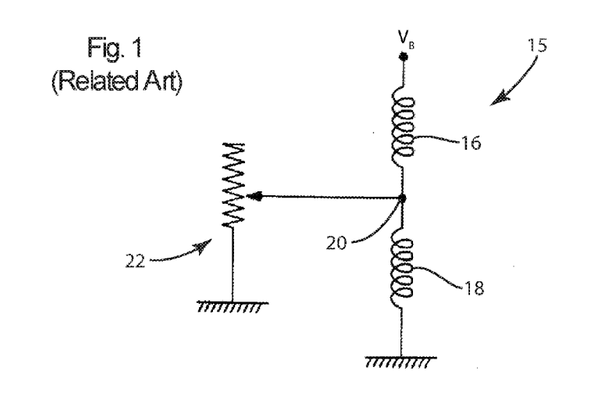
FIG. 1 illustrates one example of an analog gauge coupled to one example of a resistive-type sensor.

FIG. 1 illustrates an analog gauge 15 coupled to a resistive-type sensor, such as a rheostat sensor 22. In the example shown, the analog gauge 15 comprises a pair of coil windings, such as first coil winding 16 and second coil winding 18. The first and second coil windings 16, 18 are connected in series between a power supply, such as a battery $V_B$, and ground. The analog gauge 15 has a sender terminal 20 that is located between the first coil winding 16 and the second coil winding 18. The sender terminal 20 is electrically connected to the rheostat sensor 22, which is also connected to ground. In other words, the rheostat sensor 22 provides a parallel connection of the battery $V_B$ to ground from the sender terminal 20 of the analog gauge 15. The rheostat sensor 22 has an output resistance that depends on a sensed condition of the vehicle, for example, a level of fuel in a fuel tank, pressure of gas in an engine manifold, trim angle of an outboard motor, temperature of an engine, pressure of oil in an engine, or various other measurable conditions of a vehicle.

A permanent magnet (not shown) in the analog gauge 15 sets up a field which interacts with magnetism produced by current flowing through the first and second coil windings 16, 18. The permanent magnet is secured to a pointer (not shown) of the analog gauge 15 and the magnet and the pointer of the analog gauge 15 move as a function of a ratio of the currents flowing in the first and second coil windings 16, 18. For example, when the output resistance of the rheostat sensor 22 decreases in response to a change in the sensed condition of the vehicle, more current flows through the first coil winding 16, which causes the pointer to move based on the changed magnetic field produced by the flow of current through the first and second coil windings 16, 18.

The analog gauge 15 is calibrated such that a certain output resistance provided by the rheostat sensor 22 corresponds to an indication on a face of the analog gauge 15 of a certain value of the sensed condition of the vehicle. For example, when the rheostat sensor 22 senses a fuel level in a fuel tank, the pointer of the analog gauge 15 can range from displaying an indication of "full" to displaying an indication of "empty", where "full" corresponds to one resistance of the rheostat sensor 22 and "empty" corresponds to another resistant of the rheostat sensor 22, and resistances in between cause the pointer to lie somewhere between "full" and "empty". As another example, when the rheostat sensor 22 senses a trim position of an outboard motor 9 on a vehicle 10 such as a boat (FIG. 2) the pointer may range from "down" to "up", where a certain resistance corresponds to "down", and a certain resistance corresponds to "up", and resistances in between cause the pointer to lie somewhere between "down" and "up".

As described above, an analog gauge 15 such as that shown herein displays an indication of a sensed condition of a vehicle based on an analog signal, such as a current that changes based on a varying resistance of a rheostat sensor 22 connected to the analog gauge 15. In contrast, a digital gauge displays an indication of a sensed condition of a vehicle that is conveyed as a digital signal. The present inventors have recognized that some vehicle operators desire to view an indication of a sensed condition of the vehicle with a conventional analog gauge. However, this may require that redundant sensors be provided on the vehicle, for example a first temperature sensor providing information to a powertrain control module (PCM), which then provides a digital signal to a digital temperature gauge over a serial communications bus, and a second temperature sensor providing an analog signal in the form of a variable resistance to an analog temperature gauge. The present disclosure eliminates the need for a redundant sensor, as the present disclosure provides an analog gauge driver that drives an analog gauge to display a condition of a vehicle sensed by a sensor that provides information to the PCM. Based on information from this single sensor, the PCM can then provide the information for display by a digital gauge via the communications bus, and/or can actuate the analog gauge driver to display the information on an analog gauge. The analog gauge driver eliminates the cost of redundant sensors that sense the same condition of the vehicle.

Figure 2:
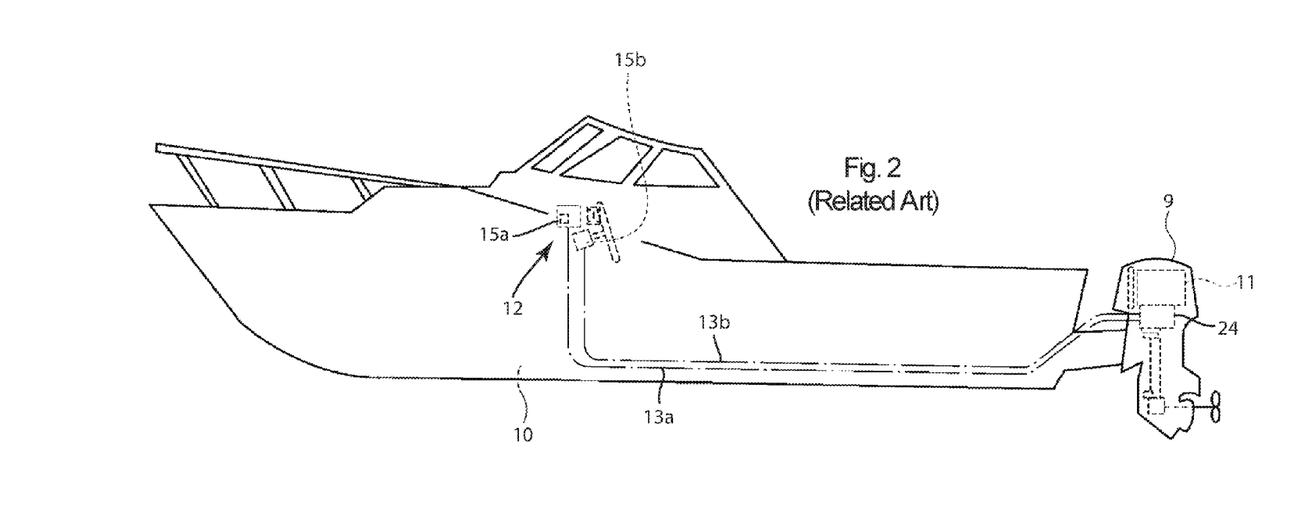
FIG. 2 illustrates one example of a vehicle having a plurality of analog gauges.

FIG. 2 illustrates one example of a vehicle 10, such as a boat, having an outboard motor 9 driven by an engine 11. One or more sensors (not shown) on the engine 11 and/or outboard motor 9 provide information to a powertrain control module (PCM) 24 that controls the engine 11 as further described herein below. The PCM 24 is electrically connected to one or more analog gauges 15a, 15b located at a helm 12 of the vehicle 10 by electrical wiring 13a, 13b. In the example shown, electrical wiring 13a, 13b individually connects each analog gauge 15a, 15b to the PCM 24. The analog gauges 15a, 15b display indications of sensed conditions of the vehicle 10, for example, indications of sensed conditions of the engine 11 and/or outboard motor 9.

In the example shown, multiple analog gauges 15a, 15b are used to display indications of multiple sensed conditions of one engine 11 and/or outboard motor 9. For example, analog gauge 15a displays a trim position of outboard motor 9 and analog gauge 15b displays a temperature of engine 11. The trim position and temperature in this example are sensed by trim and temperature sensors, respectively. It should be understood that further analog gauges 15 could be provided, such as an analog gauge 15 displaying an oil pressure of engine 11. It should also be understood that more than one engine 11 and/or outboard motor 9 could be provided on the vehicle and that further gauges could display trim positions, temperature, and oil pressure of the more than one engine 11 and/or outboard motor 9. The connections shown in FIG. 2 are for exemplary purposes only, and any number of analog gauges 15 could be provided to show any number of sensed conditions of any number of engines 11 and/or outboard motors 9. Further, although not shown herein, digital gauges can be provided and connected to the PCM 24 via a serial communications bus in order to display digital readouts of sensed conditions of the vehicle 10 as well.

Figure 3:
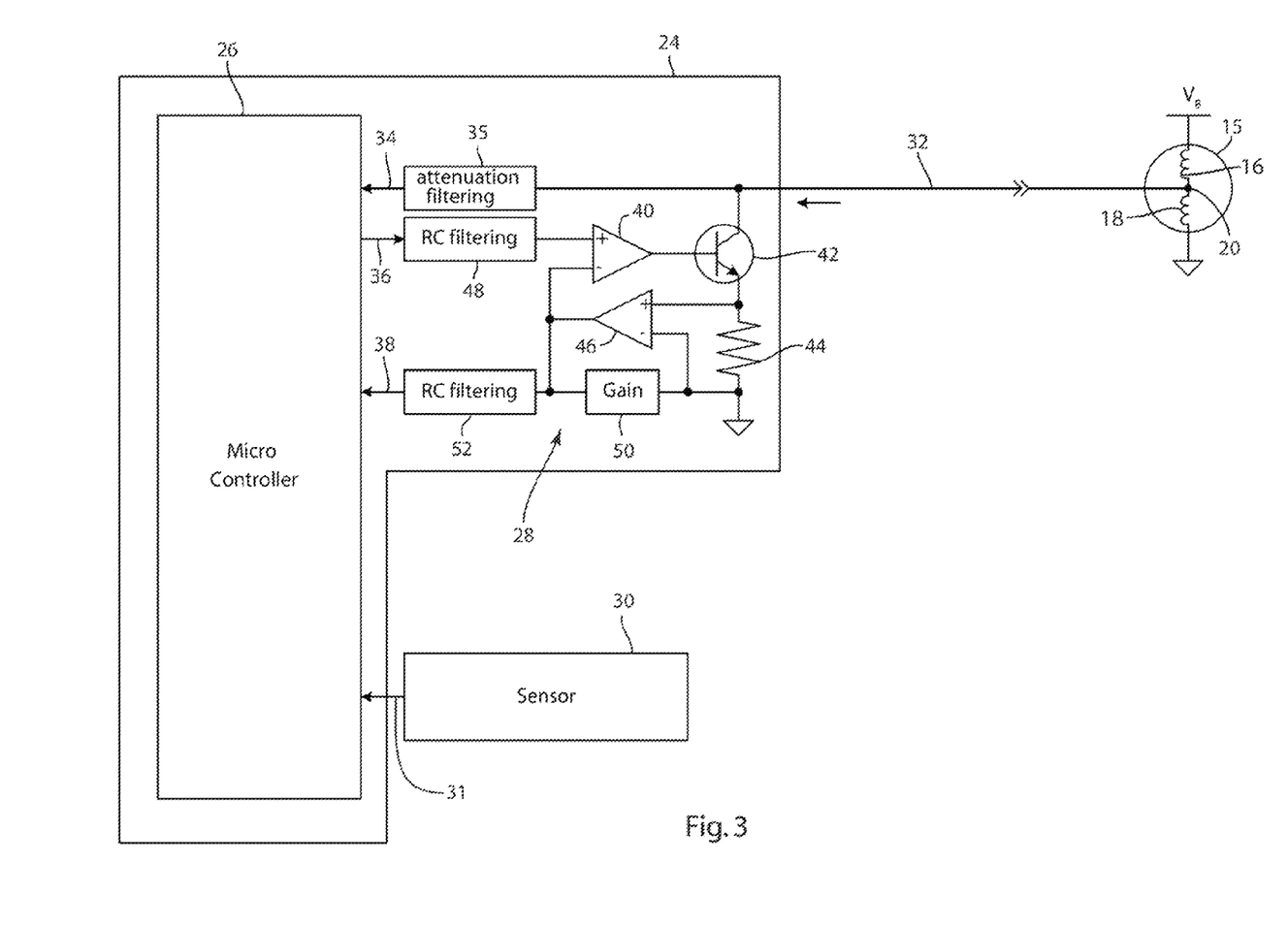
FIG. 3 illustrates one example of a system for driving an analog gauge according to the present disclosure.

FIG. 3 illustrates a system for driving an analog gauge 15 that displays an indication of a condition of a vehicle 10. In the example shown, the system comprises a PCM 24, which could be located at any location aboard the vehicle 10, such as near the engine 11, as shown in FIG. 2, or at the helm 12. The PCM 24 comprises a microcontroller 26 and a current driver circuit 28, as well as other electronic components (not shown) for controlling various other functions aboard the vehicle 10. The microcontroller 26 is shown schematically and includes a processor or CPU communicatively connected to a computer readable medium that includes volatile or nonvolatile memory upon which computer readable code is stored as software or firmware. The processor accesses the computer readable code on the computer readable medium, and upon executing the code carries out certain functions as described herein below. It should be understood that the computer readable medium may be separate from the processor, a part of the processor, or integrally connected to the processor, while in still further embodiments the computer readable medium may be implemented as a plurality of computer readable media for access by the processor. The processor sends and receives electronic control signals, and controls operations of certain components in the system such as the engine 11 and the current driver circuit 28.

The programming and operations of the microcontroller 26 are described in further detail below with respect to non-limiting examples and/or algorithms. While each of these examples/algorithms includes a specific series of steps for accomplishing certain system control functions, the scope of this disclosure is not intended to be bound by the literal order or literal content of steps described herein, and non-substantial differences or changes still fall within the scope of the disclosure. It should be understood that the microcontroller 26 can include multiple sections, although not shown herein. Further, it should be understood that the microcontroller 26 could be provided elsewhere than within the PCM 24.

The system of FIG. 3 may further comprise one or more sensors 30 that provide signals to the microcontroller 26 over input line 31, which signals represent certain conditions of the vehicle 10, as will be further described herein below. The analog gauge 15 is electrically connected to the microcontroller 26 by wiring 32 (corresponding to electrical wiring 13a, 13b in FIG. 2) and sends a signal to the microcontroller 26 as shown at line 34, as will be described further herein below. The current driver circuit 28 is connected in signal communication with the microcontroller 26, and the microcontroller 26 receives inputs from and sends outputs to the current driver circuit 28, as shown at lines 34, 36, and 38. For example, the microcontroller 26 receives an input at line 34, sends an output at line 36, and receives an input at line 38.

In operation, the microcontroller 26 receives an input signal representing a voltage at a sender terminal 20 of the analog gauge 15 and an input signal representing a condition of the vehicle from a sensor 30. The microcontroller 26 determines a desired resistance that the analog gauge 15 would require in order to display an indication of the value of the sensed condition of the vehicle, and based on the voltage at the sender terminal 20 of the analog gauge 15, calculates a current that would be required in order to simulate this desired resistance. The microcontroller 26 sends a signal to the current driver circuit 28 to drive this current, and monitors the current actually flowing through the current driver circuit 28, and thus the simulated virtual resistance, using closed loop feedback.

More specifically, the microcontroller 26 receives an input signal representing a voltage at the sender terminal 20 of the analog gauge 15, as shown at line 34. In the example shown, this signal is filtered and attenuated (as shown at box 35) to convert the analog electrical signal from the analog gauge 15 into a signal that can be read by the microcontroller 26. The microcontroller 26 also receives an input signal representing a condition of the vehicle from a sensor 30, as shown at input line 31. The microcontroller 26 converts this input signal to a value of the sensed condition of the vehicle 10. For example, the sensor 30 inputs a signal to the microcontroller 26 that is between 0-5 volts. This signal corresponds to a certain number of counts, for example 5 volts=1,000 counts. The microcontroller 26 uses an equation provided in the computer-readable code to convert the number of counts to a value of the sensed condition of the vehicle 10. For example, the number of counts could be converted to a certain value measured in pounds per square inch, degrees Celsius, degrees Fahrenheit, etc. depending on the condition of the vehicle 10 that is sensed. For example, given a signal from a pressure sensor, the microprocessor 26 may determine that 1,000 counts=50 psi.

According to the computer-readable code, the microcontroller 26 next determines a desired resistance based on the condition of the vehicle provided at input line 31. This desired resistance represents a resistance value that an exemplary rheostat sensor 22 (FIG. 1) would provide were the same condition of the vehicle 10 to be sensed by the rheostat sensor 22 instead of the sensor 30. The microcontroller 26 determines the desired resistance by entering the value of the condition of the vehicle 10 into a lookup table stored in the memory of the microcontroller 26. For example, the lookup table may indicate that a pressure value of 50 psi corresponds to 100 ohms of resistance provided by an exemplary rheostat sensor 22. The system then attempts to simulate the desired resistance in order to drive the analog gauge 15 to display an indication of the sensed condition of the vehicle 10. For example, the system attempts to simulate the above-mentioned 100 ohms of resistance in order to drive the analog gauge 15 to display an indication of 50 psi.

According to the present disclosure, the system simulates the desired resistance using the current driver circuit 28. In the example shown, the current driver circuit 28 comprises a current sink that sinks current from the analog gauge 15 via a connection of the current driver circuit 28 to the sender terminal 20 of the analog gauge 15. The current driver circuit 28 comprises a first operational amplifier 40, a transistor 42, a current sense resistor 44, and a second operational amplifier 46, the purpose and function of which will be described further herein below. The transistor 42 has a base that receives a voltage and current corresponding to the current command signal, a collector connected to the sender terminal 20 of the analog gauge 15, and an emitter connected to ground through a current sensing device, such as the current sense resistor 44. The transistor 42 operates in its linear range and varies a flow of current $I_c$ through the current driver circuit 28 according to the voltage and current at the base of the transistor 42. The current driver circuit 28 comprises one or more operational amplifiers 40, 46 that adjust the voltage and current at the base of the transistor 42 to ensure that the flow of current $I_c$ through the current driver circuit 28 corresponds to the current command signal. It should be understood that a different current sink circuit than that shown herein, or even a current source circuit, could be used to provide the same function and simulate the desired resistance.

The microcontroller 26 determines a current command signal to be sent over line 36 to the current driver circuit 28 in order to simulate the desired resistance $R_d$. To determine the current command signal, the microcontroller 26 first determines a desired current based on the equation $I_d = V/R_d$, where $R_d$ is the desired resistance read from the lookup table, and V is the voltage at the sender terminal 20 of the analog gauge 15 read at line 34. The current command signal is a PWM signal with a duty cycle proportional to the desired current determined from the equation $I_d = V/R_d$. This PWM current command signal is sent via line 36 to an RC filter 48. The RC filter 48 integrates the PWM current command signal and creates an analog electrical signal having a voltage that is applied to a non-inverting input of the first operational amplifier 40. The voltage applied to the non-inverting input of the first operational amplifier 40 represents the desired current $I_d$, or set point, for the current driver circuit 28. The first operational amplifier 40 will adjust its output so that the voltage at its inverting input is the same as the voltage at its non-inverting input, the set point.

The output of the first operational amplifier 40 controls the transistor 42, which in the example shown is an NPN-type bipolar junction transistor. As the first operational amplifier 40 tries to balance its input voltages, the voltage and current applied to the base of the transistor 42 will change and the collector and emitter currents of the transistor 42 will also change. According to the specific characteristics of the transistor 42, the current flowing from the emitter of the transistor 42 will vary based on the output from the first operational amplifier 40, but will be independent of the voltage of the battery $V_B$ connected to the analog gauge 15.

The current sense resistor 44 is connected to the emitter of the transistor 42 and converts the emitter current into a voltage. The second operational amplifier 46 is connected such that its non-inverting input is connected between the emitter of the transistor 42 and the current sense resistor 44, and its inverting input is connected between the current sense resistor 44 and ground. The second operation amplifier 46 provides gain as shown at box 50 so that the emitter current range matches the voltage set point range. Because the microcontroller 26 reads a value corresponding to voltage, the current flowing through the current driver circuit 28 must be converted back into a voltage so that the microcontroller 26 can read the value. For example, with a 0-5 volt set point range and a 0-240 milliamp current range, the required gain would be 5 volts 0.24 amps=20.8. In this example, a gain of 21 could be used, resulting in a 0-5 volt set point that can sink 0-238 milliamps of current.

The output of the second operational amplifier 46 also feeds the inverting input of the first operational amplifier 40 and, as described herein above, the first operational amplifier 40 adjusts its output to make the voltage at the inverting input the same as the voltage of the non-inverting input (set point). The gain provided by the second operational amplifier 46 therefore also provides the first operational amplifier 40 with like values for comparison purposes.

According to the present disclosure, the current driver circuit 28 is coupled to the sender terminal 20 of the analog gauge IS. As described with respect to FIG. 1, the analog gauge 15 comprises one or more coil windings 16, 18 connected between a power supply Via and ground, and the sender terminal 20 is used to adjust a current in the one or more coil windings 16, 18. In FIG. 3, however, the current driver circuit 28 provides a connection to ground from the sender terminal 20 of the analog gauge 15, rather than the rheostat sensor 22 of FIG. 1 providing such a connection. More specifically, with further reference to FIG. 3, the sender terminal 20 of the analog gauge 15 is connected to the collector of the transistor 42. The current driver circuit 28 has a virtual resistance $R_v$ that is simulated by the flow of current $I_c$ through the current driver circuit 28 and the voltage V at the sender terminal 20 of the analog gauge 15, which virtual resistance can be calculated according to $R_v = V/I_c$. Because the current driver circuit 28 is coupled to the sender terminal 20 of the analog gauge 15, the analog gauge 15 is driven according to the virtual resistance $R_v$ of the current driver circuit 28. The pointer of the analog gauge 15 displays the indication of the condition of the vehicle 10 based on this virtual resistance $R_v$ according to the principles described herein above with respect to FIG. 1.

The microcontroller 26 can monitor the current $I_c$ in the current driver circuit 28 to adjust and provide fine control to the current command signal. The microcontroller 26 receives a signal at input line 38 representing a filtered flow (see box 52) of current $I_c$ through the current driver circuit 28. Using this signal, the microcontroller 26 calculates the virtual resistance $R_v$ based on the flow of current $I_c$ through the current driver circuit 28 and the voltage at the sender terminal 20 of the analog gauge 15 according to the equation $R_v=V/I_c$. The microcontroller 26 then adjusts the current command signal sent through line 36 so as to minimize a difference between the virtual resistance $R_v$ and the desired resistance $R_d$. In one example, the microcontroller 26 minimizes the difference between the virtual resistance $R_v$ and the desired resistance $R_d$ using a PID algorithm in the computer readable code. In another example, the microcontroller 26 minimizes the difference based on an integral algorithm. In general, the microcontroller 26 can implement any closed loop feedback algorithm to minimize the difference between the virtual resistance $R_v$ and the desired resistance $R_d$. Because the microcontroller 26 can continually adjust the current command sent via line 36, the current driver circuit 28 will maintain the commanded value of desired current $I_d$ independent of voltage variation of the battery VD and independent of characteristics of the analog gauge 15.

The sensor 30 can take different forms and can comprise more than one sensor. The sensors can be digital sensors or analog sensors that provide voltages indicative of the sensed value to the microcontroller 26. In one example, the sensor 30 provides a signal to the microcontroller 26 over input line 31 that represents a directly measured condition of the vehicle 10. In another example, the sensor 30 comprises one or more sensors that provide signals to the microcontroller 26 that represent one or more conditions the vehicle 10. The microcontroller 26 can calculate the condition of the vehicle 10 to be displayed by the analog gauge 15 based on the one or more conditions of the vehicle 10. For example, in order to obtain a value for engine oil pressure, the microcontroller 26 can read a speed of the engine 11 from an engine speed sensor and can calculate the engine oil pressure from this known engine speed and other known values stored in its memory. The calculated pressure value can then be inserted into the above-mentioned lookup table to determine the resistance value (desired resistance $R_d$) that the analog gauge 15 would require in order to display an indication of that value. In another example, the microcontroller 26 could use sensors 30 providing engine speed and manifold pressure information in order to calculate a value of engine torque. The torque value then could be inserted into the lookup table to determine the resistance value that the analog gauge 15 would require in order to display an indication of that value.

As described herein above, many different sensors 30 could be used to provide information regarding various different conditions of the vehicle. For example, sensors 30 could be provided that sense an outboard motor trim position, an engine temperature, or an engine oil pressure. Conceptually, any type of sensor 30 could be used to provide information to drive any type of analog gauge 15. For example, an engine trim position sensor can provide information to the microcontroller 26, which would determine the resistance that an analog engine trim position gauge would require to display such trim position, and which would then simulate this resistance by controlling the current driver circuit 28. In the same way, an engine temperature sensor can provide information to the microcontroller 26, which would then determine the resistance that an analog temperature gauge would require to display such temperature, and which would then simulate this resistance by controlling the current driver circuit 28. A different current driver circuit 28 would be provided in the PCM 24 to drive each analog gauge, such as the trim position gauge and the temperature gauge of the above examples. It is also possible to provide a service tool that calibrates the system for use with analog gauges that expect different resistance values than those associated with typical analog gauges. For example, the service tool could provide a different lookup table that equates a sensed value of 50 psi to 200 ohms, instead of the exemplary 100 ohms described above.

Examples of analog gauges 15 that could be used are: analog trim position gauge (Mercury Marine part no. 79-895292A41, supplied by Chengdu Tianxing Instnument and Meter Co. of Chengdu, Sichuan, China); analog oil pressure gauge (Mercury Marine part no. 79-895289A42, supplied by same); and analog coolant temperature gauge (Mercury Marine part no. 79-895287A41, supplied by same). Examples of sensors 30 that could be used are: trim position sensor (Mercury Marine part no. 863187A1, supplied by Parker Hannifin Corporation of Cleveland, Ohio, Parker part no. 01196); oil pressure sensor (Mercury Marine part no. 8M6000634, supplied by Kavlico of Moorpark, Calif., Kavlico part no. P20 00-5318-2); and coolant temperature sensor (Mercury Marine part no. 885342-002, supplied by Thermometrics Corporation of Nonhridge, Calif., Thermometrics part no. A-1711). It should be understood that various other analog gauges 15 and/or sensors 30 could be used.

According to the present disclosure, when a reading from one or more of the sensors 30 changes, the input over line 31 also changes, and the microcontroller 26 determines a new equivalent resistance value (desired resistance $R_d$) that the analog gauge 15 would require in order to display that value by determining the new value of the sensed condition and entering this new value into the lookup table. The microcontroller 26 will then send the current command signal over output line 36, and the current driver circuit 28 will adjust to provide a current that, in conjunction with the voltage V at the sender terminal 20 of the analog gauge 15, simulates a virtual resistance $R_v$ that drives the analog gauge 15. The microcontroller 26 will then again provide closed loop feedback to minimize the difference between $R_d$ and $R_v$.

The system of the present disclosure does not require an added module in order to drive the analog gauge 15, as the current driver circuit 28 is provided in the PCM 24, thus saving space. Nor does the system need to be tuned to a specific analog gauge 15. Further, the system provides very little undesirable noise in the wiring harness of the vehicle 10, because the analog gauge 15 is driven by an analog electrical signal.

Figure 4:
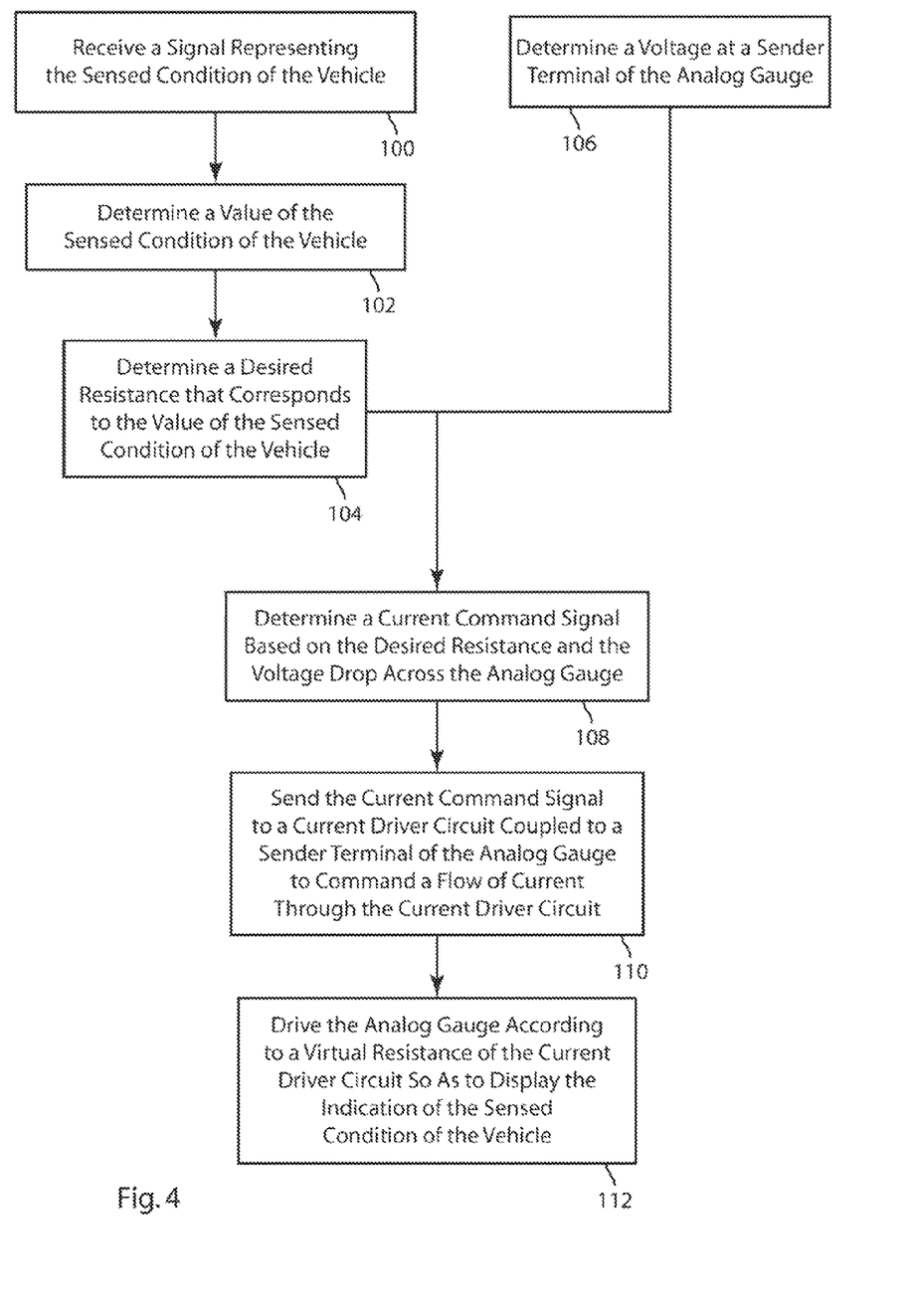
FIG. 4 illustrates one example of a method for displaying an indication of a sensed condition of a vehicle with an analog gauge.

Now turning to FIG. 4, one example of a method for displaying an indication of a sensed condition of a vehicle with an analog gauge 15 will be described. As shown at box 100, the method comprises receiving a signal representing the sensed condition of the vehicle 10. The sensed condition of the vehicle 10 may be a temperature of an engine 11 of the vehicle 10. The method then comprises determining a value of the sensed condition of the vehicle 10, as shown at box 102. As described herein above, determining the value of the sensed condition of the vehicle 10 comprises, for example, converting a certain number of counts to a value such as pounds per square inch, degrees Celsius, or degrees Fahrenheit, depending on the condition of the vehicle 10 that is sensed. As shown at box 104, the method next comprises determining a desired resistance $R_d$ that corresponds to the value of the sensed condition of the vehicle 10. For example, determining the desired resistance $R_d$ can be done by entering the value of the sensed condition of the vehicle 10 into a lookup table. The desired resistance $R_d$ may be a resistance that the analog gauge 15 would require in order to display the indication of the sensed condition of the vehicle 10.

The method further comprises determining a voltage at a sender terminal 20 of the analog gauge 15, as shown at box 106. The method then comprises determining a current command signal based on the desired resistance $R_d$ and the voltage V at the sender terminal 20 of the analog gauge 15, as shown at box 108. For example, the current command signal can be a PWM signal with a duty cycle proportional to a desired current $I_d$ determined according to the equation $I_d=V/R_d$, where $R_d$ is the desired resistance read from the lookup table, and V is the voltage at the sender terminal 20 of the analog gauge 15.

The method comprises sending the current command signal to a current driver circuit 28 coupled to the sender terminal 20 of the analog gauge 15 to command a flow of current through the current driver circuit 28, as shown at box 110. The method further comprises driving the analog gauge 15 according to a virtual resistance $R_v$ of the current driver circuit 28 so as to display the indication of the sensed condition of the vehicle 10, as shown at box 112. The virtual resistance $R_v$ of the current driver circuit is simulated by the flow of current $I_c$ through the current driver circuit 28 and the voltage V at the sender terminal 20 of the analog gauge 15, according to the equation $R_v=V/I_c$, where V is the voltage at the sender terminal 20 of the analog gauge 15, and $I_c$ is the current flowing through the current driver circuit.

The method may further comprise determining the flow of current through the current driver circuit 28, calculating the virtual resistance $R_v$ based on the flow of current $I_c$ through the current driver circuit 28 and the voltage V at the sender terminal 20 of the analog gauge 15, and adjusting the current command signal so as to minimize a difference between the virtual resistance $R_v$ and the desired resistance $R_d$. The method may further comprise minimizing the difference between the virtual resistance $R_v$ and the desired resistance $R_d$ using a closed loop feedback algorithm, such as a PID algorithm. The method may further comprise maintaining the flow of current $I_c$ through the current driver circuit 28 independently of characteristics of the analog gauge 15 and a voltage of a battery Vu powering the analog gauge 15.

In the above description, certain terms have been used for brevity, clearness and understanding. No unnecessary limitations are to be inferred therefrom beyond the requirement of the prior art because such terms are used for descriptive purposes only and are intended to be broadly construed. The different systems and method steps described herein above may be used in alone or in combination with other systems and methods. It is to be expected that various equivalents, alternatives and modifications are possible within the scope of the appended claims. Each limitation in the appended claims is intended to invoke interpretation under 35 USC §112(f), only if the terms "means for" or "step for" are explicitly recited in the respective limitation. While each of the method claims includes a specific series of steps for accomplishing certain control system functions, the scope of this disclosure is not intended to be bound by the literal order or literal content of steps described herein, and non-substantial differences or changes still fall within the scope of the disclosure.

What is claimed is:

1. A system for driving an analog gauge that displays an indication of a condition of a vehicle, the system comprising:
   a microcontroller that receives a signal representing a voltage at a sender terminal of the analog gauge and a signal representing the condition of the vehicle; and
   a current driver circuit in signal communication with the microcontroller;
   wherein the microcontroller determines a desired resistance based on the condition of the vehicle, and determines a current command signal based on the desired resistance and the voltage at the sender terminal of the analog gauge;
   wherein the microcontroller sends the current command signal to the current driver circuit to command a flow of current through the current driver circuit;
   wherein the current driver circuit is coupled to the sender terminal of the analog gauge and has a virtual resistance simulated by the flow of current through the current driver circuit and the voltage at the sender terminal of the analog gauge; and
   wherein the analog gauge is driven according to the virtual resistance of the current driver circuit so as to display the indication of the condition of the vehicle.

2. The system of claim 1, wherein the microcontroller receives a signal representing the flow of current through the current driver circuit, calculates the virtual resistance based on the flow of current through the current driver circuit and the voltage at the sender terminal of the analog gauge, and adjusts the current command signal so as to minimize a difference between the virtual resistance and the desired resistance.

3. The system of claim 2, wherein the microcontroller minimizes the difference between the virtual resistance and the desired resistance using a PID algorithm.

4. The system of claim 1, further comprising a sensor that provides the signal representing the condition of the vehicle to the microcontroller.

5. The system of claim 4, wherein the microcontroller determines a value of the condition of the vehicle based on the signal representing the condition of the vehicle, and determines the desired resistance by entering the value of the condition of the vehicle into a lookup table stored in a memory of the microcontroller.

6. The system of claim 5, wherein the desired resistance is a resistance that the analog gauge would require in order to display the indication of the condition of the vehicle.

7. The system of claim 4, wherein the sensor provides a signal to the microcontroller that represents a directly measured condition of the vehicle.

8. The system of claim 4, wherein the sensor comprises one or more sensors that provide signals to the microcontroller that represent one or more conditions of the vehicle, and wherein the microcontroller calculates the condition of the vehicle to be displayed by the analog gauge based on the one or more conditions of the vehicle.

9. The system of claim 1, wherein the analog gauge comprises one or more coil windings connected between a power supply and ground, wherein the sender terminal of the analog gauge is used to adjust a current in the one or more coil windings, and wherein the current driver circuit provides a connection to ground from the sender terminal of the analog gauge.

10. The system of claim 9, wherein the current driver circuit comprises a transistor having a base that receives a voltage and current corresponding to the current command signal, a collector connected to the sender terminal of the analog gauge, and an emitter connected to ground through a current sensing device, wherein the transistor operates in its linear range and varies the flow of current through the current driver circuit according to the voltage and current at the base of the transistor.

11. The system of claim 10, wherein the current driver circuit comprises one or more operational amplifiers that adjust the voltage and current at the base of the transistor to ensure that the flow of current through the current driver circuit corresponds to the current command signal.

12. The system of claim 1, further comprising a powertrain control module, wherein the microcontroller and the current driver circuit are provided in the powertrain control module.

13. The system of claim 1, wherein the condition of the vehicle is a temperature of an engine of the vehicle.

14. A method for displaying an indication of a sensed condition of a vehicle with an analog gauge, the method comprising:
receiving a signal representing the sensed condition of the vehicle;
determining a value of the sensed condition of the vehicle;
determining a desired resistance that corresponds to the value of the sensed condition of the vehicle;
determining a voltage at a sender terminal of the analog gauge;
determining a current command signal based on the desired resistance and the voltage at the sender terminal of the analog gauge;
sending the current command signal to a current driver circuit coupled to the sender terminal of the analog gauge to command a flow of current through the current driver circuit; and
driving the analog gauge according to a virtual resistance of the current driver circuit so as to display the indication of the sensed condition of the vehicle;
wherein the virtual resistance of the current driver circuit is simulated by the flow of current through the current driver circuit and the voltage at the sender terminal of the analog gauge.

15. The method of claim 14, further comprising:
determining the flow of current through the current driver circuit;
calculating the virtual resistance based on the flow of current through the current driver circuit and the voltage at the sender terminal of the analog gauge; and
adjusting the current command signal so as to minimize a difference between the virtual resistance and the desired resistance.

16. The method of claim 15, further comprising minimizing the difference between the virtual resistance and the desired resistance using a PID algorithm.

17. The method of claim 16, further comprising determining the desired resistance from a lookup table.

18. The method of claim 17, wherein the desired resistance is a resistance that the analog gauge would require in order to display the indication of the sensed condition of the vehicle.

19. The method of claim 14, wherein the sensed condition of the vehicle is a temperature of an engine of the vehicle.

20. The method of claim 14, further comprising maintaining the flow of current through the current driver circuit independently of characteristics of the analog gauge and a voltage of a battery powering the analog gauge.

* * * * *